(12) United States Patent
Han et al.

(10) Patent No.: US 8,155,181 B2
(45) Date of Patent: Apr. 10, 2012

(54) MULTILAYER-BASED VIDEO ENCODING METHOD AND APPARATUS THEREOF

(75) Inventors: Woo-jin Han, Suwon-si (KR); So-young Kim, Gangnam-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1415 days.

(21) Appl. No.: 11/709,124

(22) Filed: Feb. 22, 2007

(65) Prior Publication Data

US 2007/0237228 A1     Oct. 11, 2007

Related U.S. Application Data

(60) Provisional application No. 60/790,805, filed on Apr. 11, 2006.

(30) Foreign Application Priority Data

Jul. 21, 2006    (KR) .......................... 10-2006-0068759

(51) Int. Cl.
 *H04N 11/02*     (2006.01)
(52) U.S. Cl. .......... 375/240.01; 375/240.12; 375/240.13
(58) Field of Classification Search ................. 375/240, 375/240.03, 240.12, 240.23, 240.24, 240.25
See application file for complete search history.

(56) References Cited

U.S. PATENT DOCUMENTS 7,310,377 B2 *  12/2007  Wang et al. .............. 375/240.24
7,706,442 B2 *   4/2010  Kuo ......................... 375/240.12

FOREIGN PATENT DOCUMENTS

CN         1764280 A    4/2006

OTHER PUBLICATIONS

First Office Action issued May 13, 2010 in counterpart Chinese Application No. 200780021806.7.

* cited by examiner

*Primary Examiner* — Hosuk Song
(74) *Attorney, Agent, or Firm* — Sughrue Mion, PLLC

(57) ABSTRACT

A method and apparatus are provided for reducing the inter-layer redundancy of a difference signal obtained from an intra-prediction when coding a video using multi-layer structure supporting intra-prediction. The method includes obtaining a first difference block between a block of a first layer and a first prediction block which is used to perform an intra-prediction on the block, obtaining a second difference block between a block of a second layer corresponding to the block of the first layer and a second prediction block which is used to perform an intra-prediction on the block, and obtaining a final difference block between the first difference block and the second difference block.

21 Claims, 9 Drawing Sheets

MULTILAYER-BASED VIDEO ENCODING METHOD AND APPARATUS THEREOF

CROSS-REFERENCE TO RELATED APPLICATION

This application claims priority from Korean Patent Application No. 10-2006-0068759 filed on Jul. 21, 2006, in the Korean Intellectual Property Office, and U.S. Provisional Patent Application No. 60/790,805 filed on Apr. 11, 2006 in the United States Patent and Trademark Office, the disclosures of which are incorporated herein by reference in their entirety.

BACKGROUND OF THE INVENTION

1. Field of the Invention

Methods and apparatuses consistent with the present invention relate to video compression, and more particularly, to reducing inter-layer redundancy of a difference signal obtained from an intra-prediction when coding a video using a multi-layer structure supporting intra-prediction.

2. Description of the Related Art

Development of communication technologies such as the Internet has led to an increase in video communication in addition to text and voice communication. However, consumers have not been satisfied with existing text-based communication schemes. To satisfy various consumer needs, services for multimedia data containing text, images, music and the like have been increasingly provided. Multimedia data is usually voluminous and requires a large capacity storage medium. Also, a wide bandwidth is required for transmitting the multimedia data. Accordingly, a compression coding scheme is required when transmitting multimedia data.

A basic principle of data compression is to eliminate redundancy in the data. Data can be compressed by removing spatial redundancy, which is the duplication of colors or objects in an image, temporal redundancy, which is little or no variation between adjacent frames in a moving picture or successive repetition of the same sounds in audio, or perceptual-visual redundancy referring to the limitations of human vision and the inability to hear high frequencies.

So far, a variety of standards, such as MPEG-2, MPEG-4, and H.254, have been suggested as video compression methods. In addition, the Joint Video Team (JVT), which is a joint working group of the Moving Picture Experts Group (MPEG) and the International Telecommunication Union (ITU), is doing work for standardization, hereinafter, referred to as "H.264 SE" (Scalable Extension), in order to implement scalability in multi-layer-based H.264.

FIG. 1 illustrates the concept of scalable video coding method according to the Scalable Video Coding (SVC) standard. As an example of scalable video coding, a basic layer can be set as a quarter common intermediate format (QCIF) and has a frame rate of 15 Hz, a first enhancement layer can be set as a common intermediate format (CIF) and has a frame rate of 30 Hz, and a second enhancement can be set as a standard definition (SD) and has a frame rate of 60 Hz.

Inter-layer correlation can be used to encode a multi-layer video frame. For example, a certain area 12 among video frames of the first enhancement layer can be effectively encoded through a prediction performed from the corresponding area 13 included in a video frame of a base layer. Similarly, an area 11 among the second enhancement layer video frames can be effectively encoded through a prediction performed from the area 12 of the first enhancement layer. If resolution for each layer in the multi-layer video is different, an image of the base layer needs to be up-sampled prior to the prediction.

In the SVC standard, an intra-prediction performed with reference to a frame having a similar temporal position, as well as an inter-prediction performed with reference to a frame having a different temporal position on the conventional single layer are supported. In the intra-prediction, a directional intra-prediction performed with reference to other area in the frame to be predicted, and an intra-prediction (also, referred to as "intra-base-layer prediction"), performed with reference to the lower layer frame having a temporal position identical to the frame to be predicted, are supported.

FIG. 2 is a conceptual diagram illustrating the three prediction methods. With reference to FIG. 2, a directional intra-prediction can be performed on a certain block 4 of the current frame 1 by using the information on neighboring blocks, or the inter-prediction can be performed on the block 4 by using a frame 2 (previous or future frame) having a temporal position different from that of the current frame 1. The intra-base prediction can be performed on the block 4 by using the information of the corresponding area 6 included in the lower layer frame 3 having a temporal position identical to the current frame 1.

Generally, a prediction implies a process of reducing the complexity of a to-be-coded signal by subtracting the prediction block available in a video encoder and video decoder from a frame to be coded or a block (coding object). The result of subtracting a prediction block from the coding object is referred to as a difference signal. Ultimately, the differences between the three prediction methods in FIG. 2 is the way in which the prediction block is obtained.

SUMMARY OF THE INVENTION

The present invention provides a method and apparatus for improving the compression efficiency of a video encoder and the picture quality of an image reproduced by a video decoder.

According to an aspect of the present invention, there is provided a method of encoding a video frame having a plurality of layers, the method including obtaining a first difference block between a block of the first layer and a first prediction block which was used to perform an intra-prediction on the block, obtaining a second difference block between a block of the second layer corresponding to the block of the first layer and a second prediction block which was used to perform an intra-prediction on the block, and obtaining a final difference block between the first difference block and the second difference block.

According to another aspect of the present invention, there is provided a method of decoding a video, the method including reconstructing the first difference block from the coded data of the first layer included in the input bitstream, reconstructing the final difference block from the coded data of the second layer included in the bitstream, reconstructing the second difference block by adding the first difference block to the final difference block, generating a prediction block with respect to the block of the second layer included in a video frame in order to be reconstructed through the intra-prediction, and reconstructing the block of the second layer by adding the generated prediction block to the reconstructed second difference block.

According to a further aspect of the present invention, there is provided a video encoder for encoding a video frame having a plurality of blocks, the video encoder including a unit which obtains the first difference block between a block of a first layer and a first prediction block which performed an intra-prediction on the block, a unit which obtains a second difference block between a block of the second layer corresponding to the block of the first layer and a second prediction block which performed an intra-prediction on the block, and a unit which obtains a final difference block between the first difference block and the second difference block.

According to still another aspect of the present invention, there is provided a video decoder including a unit which reconstructs the first difference block from the coded data of the first layer included in the input bitstream, a unit which reconstructs the final difference block from the coded data of the second layer included in the bitstream, a unit which reconstructs the second difference block by adding the first difference block to the final difference block, a unit which generates a prediction block with respect to the block of the second layer included in a video frame in order to be reconstructed through the intra-prediction, and a unit which reconstructs the block of the second layer by adding the generated prediction block to the reconstructed second difference block.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

A method of performing a residual prediction (hereinafter, referred to as the "difference prediction") of difference block for each layer generated by an intra-prediction is disclosed in the present invention. The present invention will now be described more fully with reference to the accompanying drawings, in which exemplary embodiments of the invention are shown.

As mentioned above, the intra-prediction implies a prediction method performed by using a frame having a temporal position identical to the block to be coded, such as directional-intra-prediction or intra-base-prediction. Hereinafter, in the present specification, the description will be made in an order of an exemplary embodiment (hereinafter, referred to as the "first exemplary embodiment") which applied the difference prediction with respect to the directional intra-prediction, and an exemplary embodiment (hereinafter, referred to as the "second exemplary embodiment") which applied the difference prediction with respect to the intra-base-prediction. In the exemplary embodiments, a block is an image area of a video frame and can have a variety of sizes such as 4×4, 8×8, and 16×16.

Figure 3:
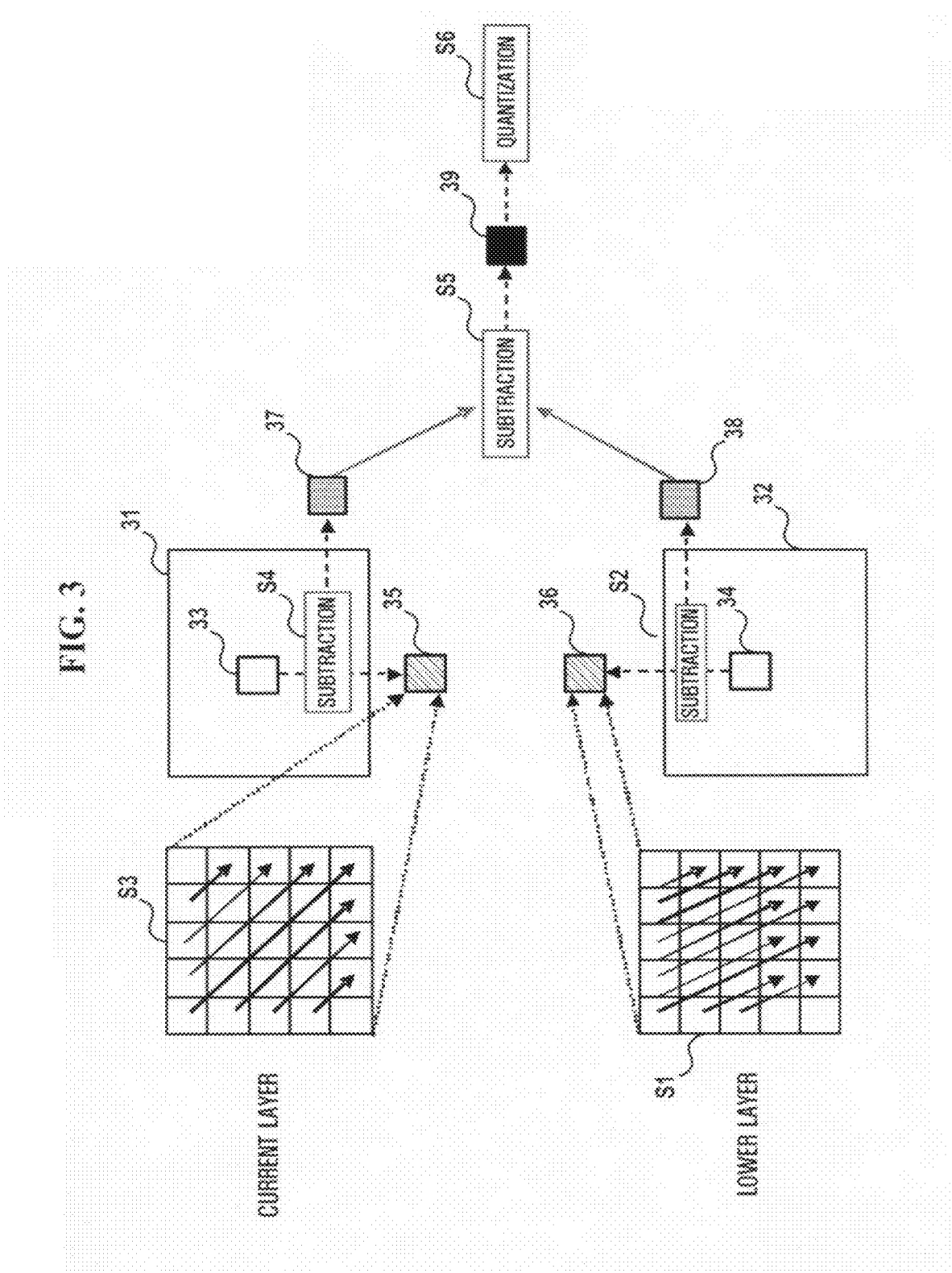
FIG. 3 describes the concept of a difference-prediction method according to a first exemplary embodiment of the present invention.

FIG. 3 describes the concept of a difference-prediction method according to a first exemplary, embodiment of the present invention. An object of the present invention is to express a block 33 to be coded among the current layer frame 31 more effectively.

First, a prediction block (prediction signal) 36 with respect to a block 34 on a lower layer frame 32 corresponding to the block 33 is generated (S1). The prediction block 36 is obtained through the directional intra-prediction with respect to the block 34. Then, a difference block 38 is generated by subtracting the prediction block 36 from the block 34 (S2).

Similarly, a prediction block (prediction signal) 35 with respect to the block 33 of the current layer frame is generated (S3). The prediction block 35 is obtained through a directional intra-prediction with respect to the block 33. Then, a difference block (difference signal) 37 is generated by subtracting the prediction block 35 from the block 33 (S4). The difference block 37 generated in the current layer and the difference block 38 generated in the lower layer are images that are different from an original image and that are mostly composed of high-frequency components. However, redundancy among the high-frequency components (similarity among the images) may still remain.

Therefore, in order to remove the redundancy, a final difference block 39 is generated by performing a residual subtracting for the difference block 38 generated by the lower layer from the difference block 37 generated by the current layer (S5), which means that even the redundancy existing in the process of subtracting can be mostly removed. Finally, the generated final difference block 39 is quantized (S6).

Figure 4:
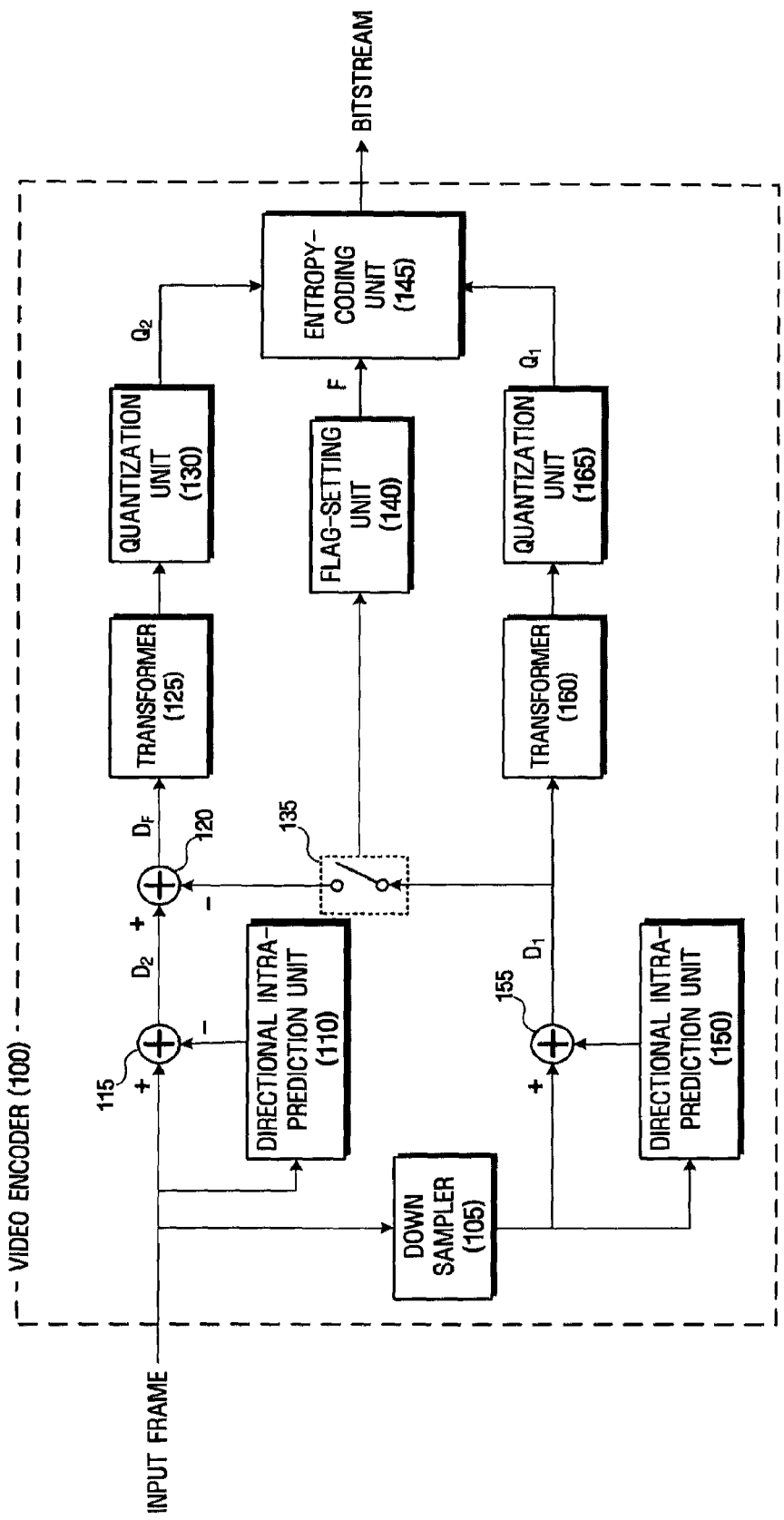
FIG. 4 is a block diagram illustrating a video encoder according to a first exemplary embodiment of the present invention.

FIG. 4 is a block diagram illustrating a video encoder 100 according to a first exemplary embodiment of the present invention. With reference to FIG. 4, an input frame is input to a subtractor 115, a directional intra-prediction unit 110, and a down-sampler 105.

The down-sampler 105 down-samples the input frame based on one of the resolution, the frame rate, and the bit ratio. For example, the down-sampler 105 may convert the size of the input frame by ½ in the resolution side, convert the number of input frames by ½ in the frame side, and convert the bit ratio of the input frame by ½. As such, the output that passed the down-sampler is changed into a lower layer frame of the original input frame.

The output from the down-sampler 105 can be input to a subtractor 155 and a directional intra-prediction unit 150. The directional intra-prediction unit 150 generates a prediction block with respect to the block (34 of FIG. 3) to be coded in the lower layer by using neighboring images of the block 34 (through the directional intra-prediction).

Figure 1:
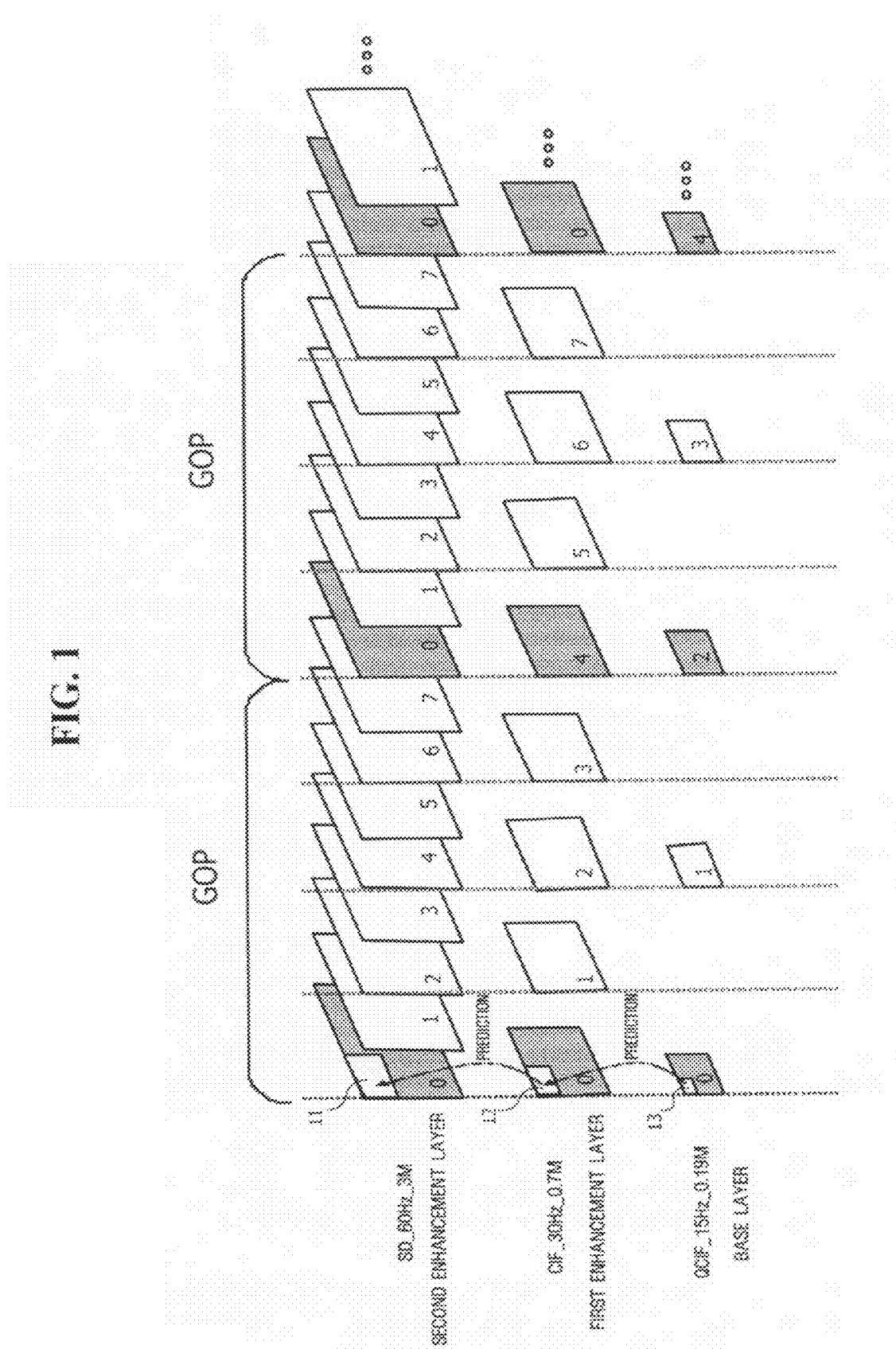
FIG. 1 illustrates a concept of a scalable video coding method according to the SVC standard.
Figure 2:
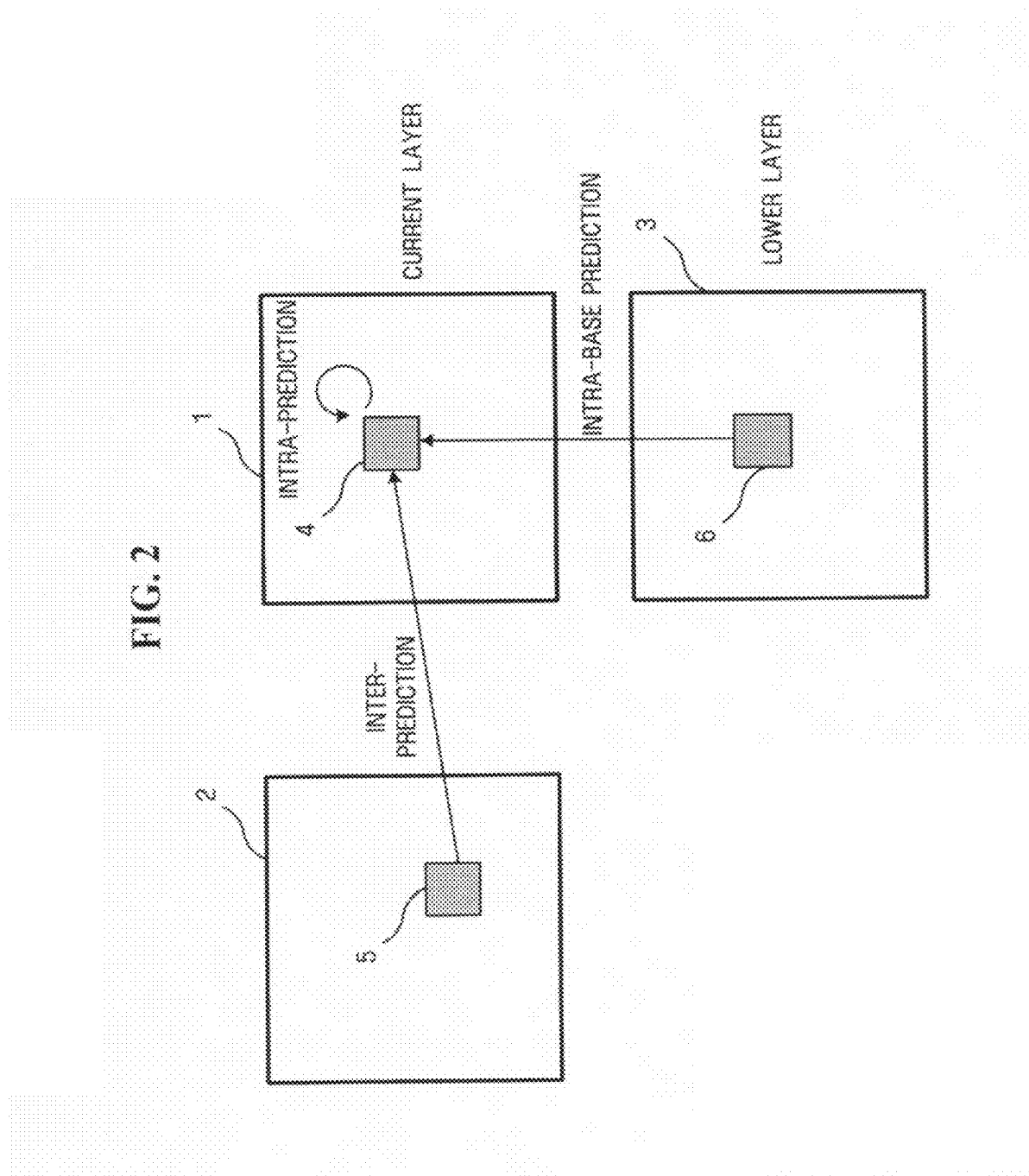
FIG. 2 is a conceptual diagram describing three prediction methods.
Figure 5:
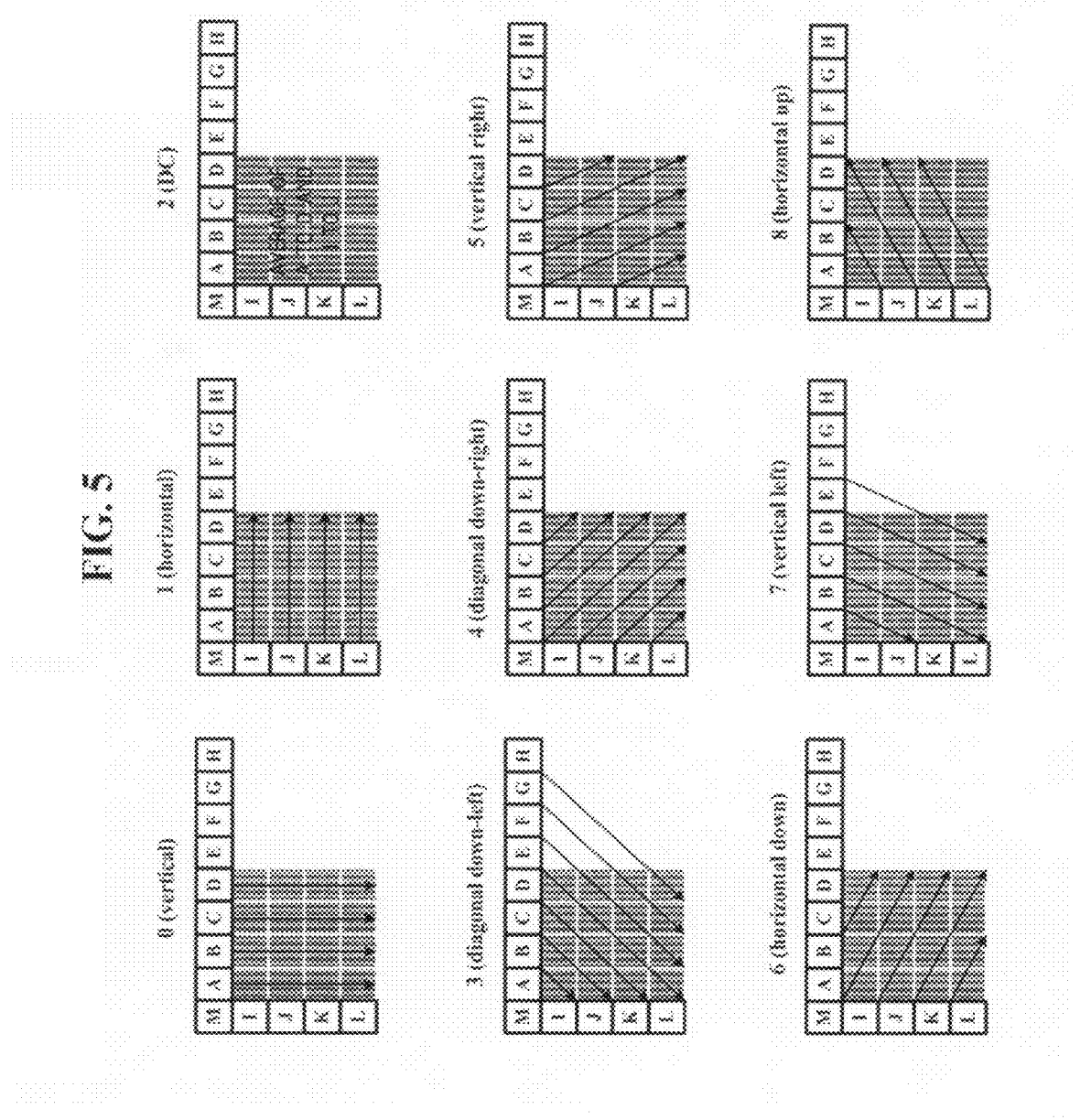
FIG. 5 illustrates a method of generating a prediction block according to a directional intra-prediction mode.

Directional intra-prediction is a method of predicting the values of the current block by copying a single block (4×4 block) to the predetermined direction by using the neighboring pixels of the upward or leftward direction. As a prediction mode for 4×4 block, total nine modes are supported in the SVC standard as illustrated in FIG. 1. In FIG. 5, the hatched area indicates a position of the block to be coded, A to M indicate neighboring pixel of the block, and the prediction block of the block in the individual modes can be obtained by being interpolated or extrapolated to an arrow direction.

The directional intra-prediction unit 150 generates a prediction block according to the corresponding mode by selecting an optimal mode in FIG. 5 and provides the prediction block to the subtractor 155. The subtractor 155 generates a first difference block $D_1$ by subtracting the prediction block provided by the block 34.

Similarly, the directional intra-prediction unit 110 generates a prediction block with respect to the block (33 of FIG. 3) to be coded in the current layer by using neighboring blocks of the block 33 (through a directional intra-prediction). The subtractor 115 generates a second difference block $D_2$ by subtracting the prediction block generated by the directional intra-prediction unit 110 from the block 33.

A switch 135 provides the first difference block $D_1$ to the subtractor 120 depending on whether to use the difference prediction according to the present invention. If the difference prediction is used, the subtractor 120 subtracts the first difference block $D_1$ from the second difference block $D_2$ to obtain a final difference block $D_F$ for the block 33 of the current layer.

The final difference block $D_F$ is provided to an entropy-coding unit 145 through a transformer 125 and quantization unit 130. If every value included in the final difference block $D_F$ is below a certain threshold, the values are regarded as 0 and they do not have to go through the transformer 125 and quantization unit 130.

The transformer 125 performs spatial transform with respect to the final difference block $D_F$ to generate transform coefficients. The discrete cosine transform (DCT) or a wavelet transform can be used for the spatial transform method. If the DCT is used for the spatial transform, the transform coefficient indicates the DCT coefficient. If the wavelet transform is used, the transform coefficient indicates the wavelet coefficient.

The quantization unit 130 quantizes the transform coefficient. The quantization refers to a process for expressing the transform coefficient having a predetermined real number value into a discrete value, and matching it to a predetermined index. The quantization method includes a scalar quantization and a vector quantization.

The first difference block $D_1$ is provided to the entropy-coding unit 145 through a transformer 160 and a quantization unit 165. Similar to the final difference block $D_F$, the first difference block $D_1$ does not have to pass the transformer 125 and the quantization unit 130.

A flag-setting unit 140 sets a flag indicating if the difference prediction according to the present invention has been used, and provides it to an entropy-coding unit 145. For example, if the set value of flag is 1, it indicates that the difference prediction is used and, if 0, it indicates that the difference prediction is not used but the conventional method is used. The flag can be set in a macroblock, slice, or frame unit.

The entropy-coding unit 145 generates a bit stream by performing lossless coding of the transform coefficients $Q_2$ and $Q_1$ respectively quantized by the quantization unit 130 and the quantization unit 165, and the flag value F set by the flag-setting unit 140. The lossless coding method includes arithmetic coding and variable length coding.

The video encoder 100 of FIG. 4 is implemented as an open-loop type. Generally, in order to reduce drift errors generated between the video encoder and video decoder, a video encoder uses a symmetrical structure for both sides (closed-loop type). The video encoder 100 can obtain a neighboring image used to perform a directional intra-prediction of the coded blocks 33, 34 not from an original frame like FIG. 4 but from a frame reconstructed through quantization and inverse-quantization in order to have the closed-loop type.

Figure 6:
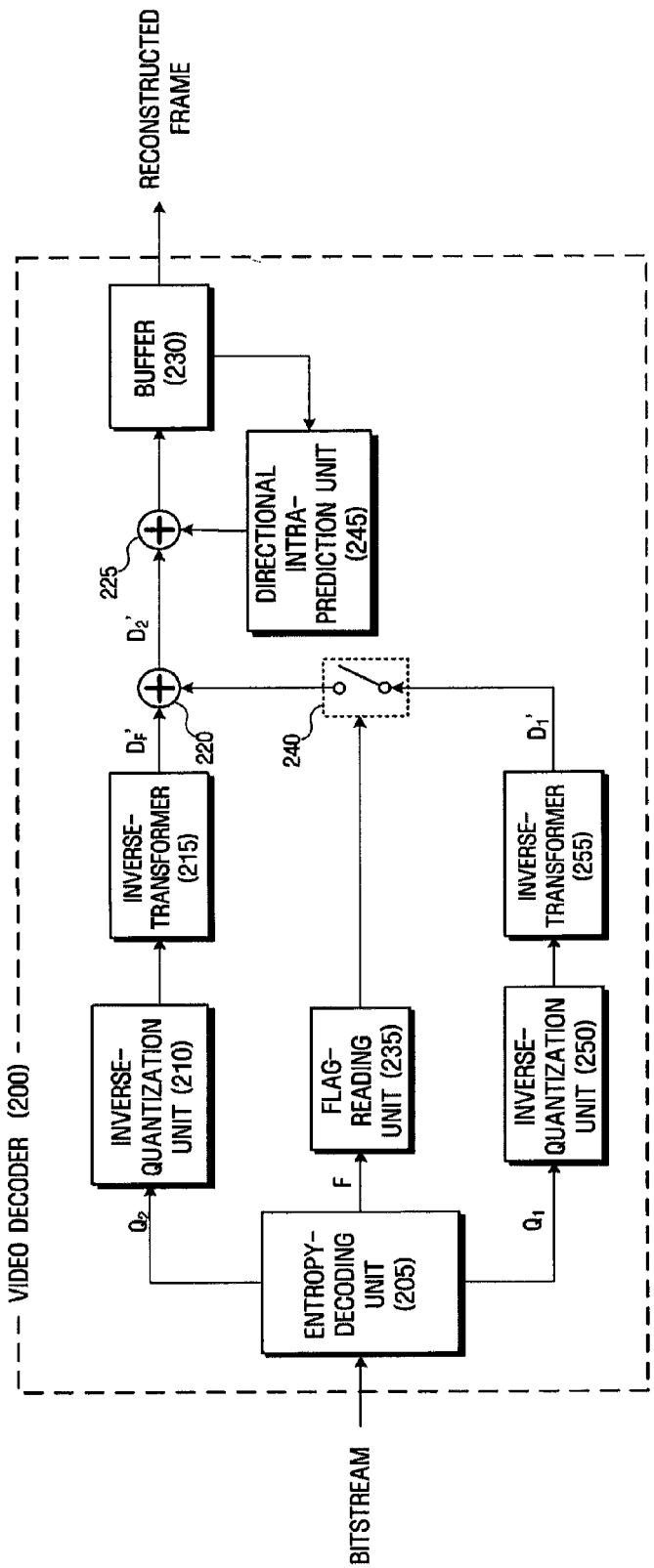
FIG. 6 is a block diagram illustrating configuration of a video decoder according to a first exemplary embodiment of the present invention.

FIG. 6 is a block diagram illustrating configuration of a video decoder 200 according to a first exemplary embodiment of the present invention. The entropy-decoding unit 205 performs lossless decoding for the input bitstream, so as to extract a quantization coefficient $Q_2$ of a current layer, a quantization coefficient $Q_1$ and a flag F of a lower layer. The lossless decoding is performed inversely against lossless coding in the entropy-coding unit 145.

A inverse-quantization unit 250 inversely quantizes the quantization coefficient $Q_1$ of the lower layer. The inverse-quantization procedure corresponds to the inverse of the quantization procedure performed in the quantization unit 165, and reconstructs the real coefficient (transform coefficient) corresponding to the quantization coefficient expressed as a predetermined index.

An inverse-transformer 255 inversely transforms the result of the de-quantization to reconstruct the first difference block $D_1'$. The reconstructed first difference block $D_1'$ is what was generated through quantization and inverse-quantization, which is not exactly identical to the first difference block $D_1$. Hereinafter, every prime signal (') indicates the reconstructed data, which means that it may not be exactly identical to an original data. The inverse-transform corresponds to the inverse of the transforming process performed in the transformer 160.

A flag-reading unit 235 reads out the extracted flag F to determine if the difference prediction has been applied to the input bitstream. If the difference prediction is applied, a switch 240 provides the reconstructed first difference block $D_1'$ to a subtractor 220.

An inverse-quantization unit 210 inversely quantizes a quantization coefficient $Q_1$ of a current layer, and a inverse-transformer 215 inversely transforms the result of the de-quantization and reconstructs the final difference block $D_F'$.

Then, the subtractor 220 reconstructs the second difference block $D_2'$ by adding the reconstructed final difference block $D_F'$ to the reconstructed first difference block $D_1'$.

A directional intra-prediction unit 245 generates the prediction block with respect to a block to be decoded in the current layer by using a neighboring image of the to-be-decoded block (through a directional intra-prediction). At this time, the neighboring image is a data stored in the pre-reconstructed buffer 230.

An adder 225 adds the reconstructed second difference block $D_2'$ and the generated prediction block, reconstructs the to-be-decoded block, and stores it in the buffer 230. The buffer 230, in which a plurality of blocks included in a single frame, reconstructs a complete frame from them.

Figure 7:
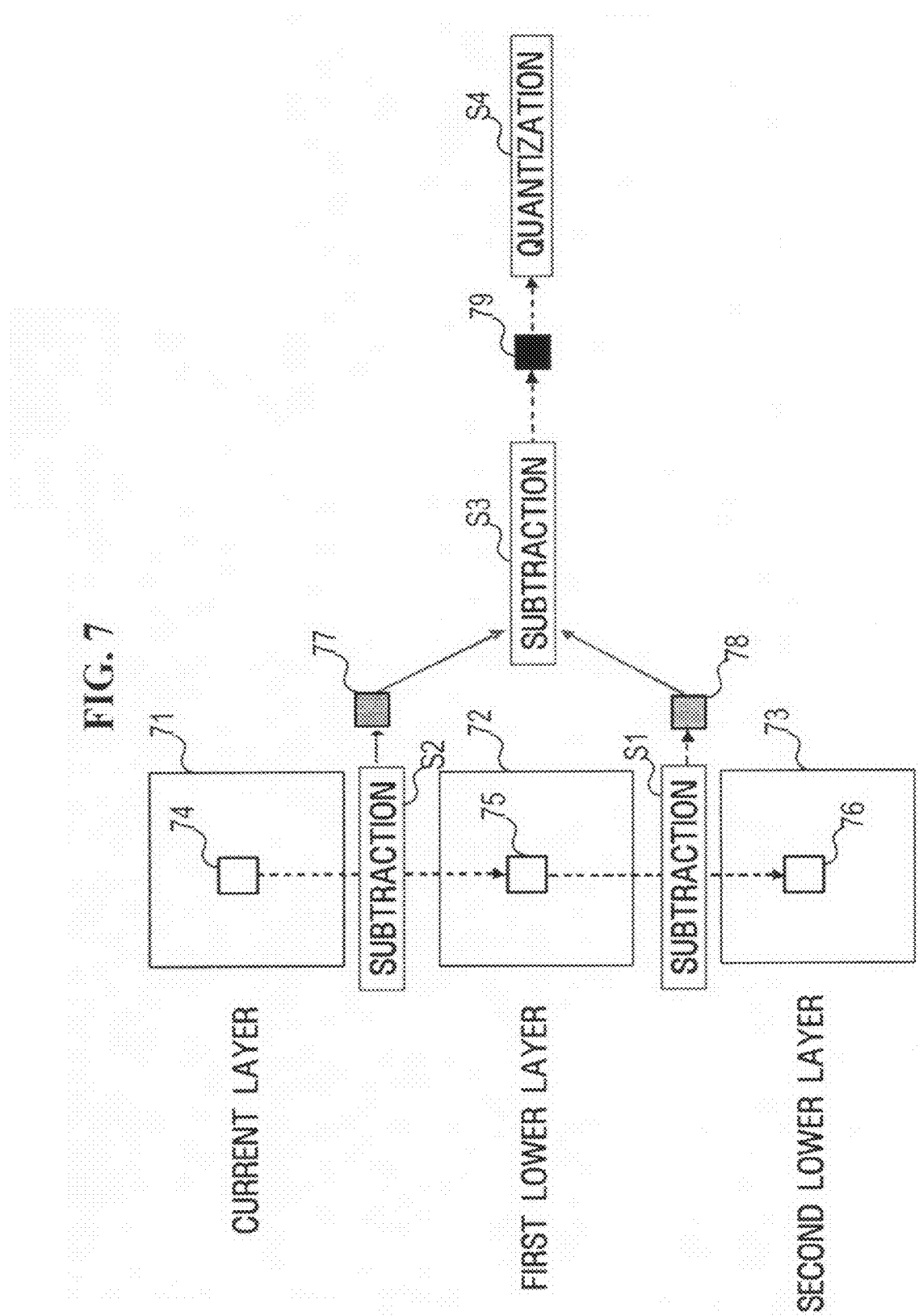
FIG. 7 describes a concept of a difference-prediction method according to a second exemplary embodiment of the present invention.

FIG. 7 describes a concept of a difference-prediction method according to a second exemplary embodiment of the present invention.

The intra-base-prediction is performed between two layers, and, as a result, a single difference block is generated. The second exemplary embodiment of the present invention is for performing the residual subtraction for the redundancy between the difference blocks obtained from the result of intra-base-prediction, and at least three layers are required to apply the second exemplary embodiment. Therefore, a video frame composed of three layers is exemplified in the present invention, however, it can be fully understood by those of ordinary skill in the art that the video frame can be composed of four or more layers.

According to FIG. 7, a block 74 of the current layer frame 71 is a block to be coded through the difference prediction.

The block 74 temporally and spatially corresponds to a block 76 of a second lower layer frame 73.

First, a block 75 of the first lower layer is predicted by using the block 76 of the corresponding lower layer as a prediction signal. That is, a first difference block 78 is generated by subtracting the corresponding block 76 from the block 75 of the first lower layer (S1).

Similarly, the block 74 of the current layer is predicted by using the block 75 of the corresponding first lower layer as a prediction signal. That is, a second difference block 77 is generated by subtracting the corresponding block 75 from the block 75 of the current layer (S2).

A final difference block 79 is generated by subtracting the first difference signal 78 from the second difference signal 77 in order to remove the redundancy of the first difference signal 78 and second difference signal 77 (S3). Finally, the generated final difference block 79 is quantized (S4).

Figure 8:
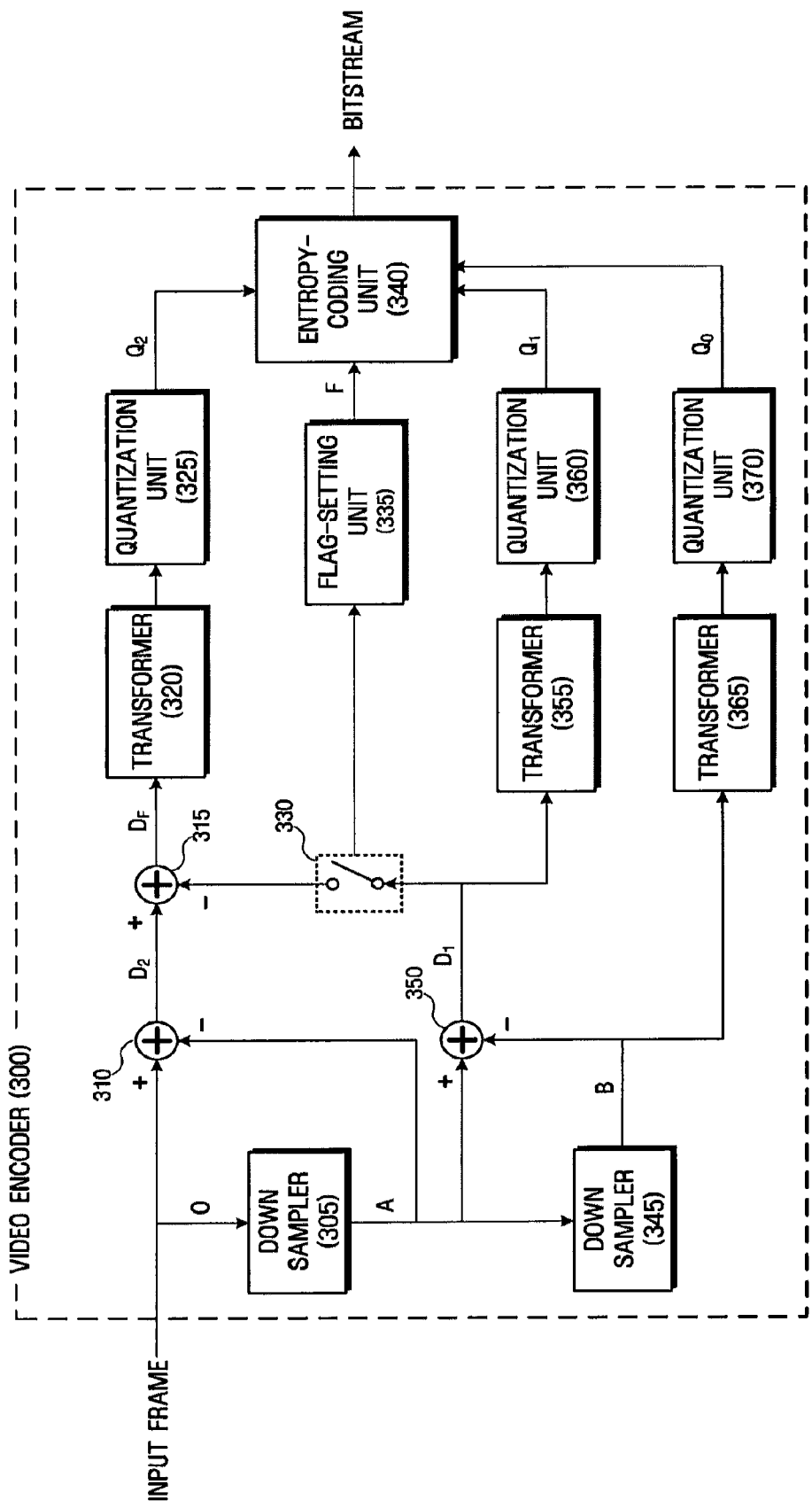
FIG. 8 is a block diagram illustrating configuration of a video encoder according to a second exemplary embodiment of the present invention.

FIG. 8 is a block diagram illustrating configuration of a video encoder according to a second exemplary embodiment of the present invention. With reference to FIG. 8, the input frame is input to an adder 310 and a down-sampler 305.

The down-sampler 305 down-samples the input frame to a level of the first lower layer frame, based on one of the resolution, the frame rate, and the bit ratio. The output of the down-sampler 305 is input to the subtractor 350 and a down-sampler 345. Similarly, the down-sampler 345 down-samples the first lower layer frame to the level of the second lower layer frame, based on one of the resolution, frame rate, or bit ratio.

The subtractor 350 subtracts a block B of the second lower layer frame provided by the down-sampler 345 from a block A of the first lower layer frame provided by the down-sampler 305. Similarly, the adder 310 generates the second difference block $D_2$ by subtracting a block A of the first lower layer frame provided by the down-sampler 305 from a block O to be coded by the current layer frame.

A switch 330 provides the first difference block $D_1$ to a subtractor 315 depending on whether the difference prediction according to the present invention is used. When the difference prediction is used, the subtractor 315 subtracts the first difference block $D_1$ from the second difference block $D_2$ to obtain the final difference block $D_F$ with respect to the to-be-coded block O in the present layer.

A block B of the second lower layer frame provided by the down-sampler 345 is provided to an entropy-coding unit 340 through a transformer 365 and quantization unit 370 $Q_0$, a first difference block $D_1$ provided by the subtractor 350 is provided to the entropy-coding unit 340 through a transformer 355 and quantization unit 360 $Q_1$, and the obtained final difference block $D_F$ is provided to the entropy-coding unit 340 through a transformer 320 and quantization unit 325 $Q_2$. As mentioned above, when the value input to the transformers 320, 355, 365 is small, it may not pass the transformers 320, 355, 365 and the quantization units 325, 360, 370.

A flag-setting unit 335 sets a flag (one-bit flag) indicating if the difference prediction according to the present invention is used and provides it to the entropy-coding unit 340.

The entropy-coding unit 340 generates a bitstream by performing lossless coding of the transform coefficients $Q_2$, $Q_1$, $Q_0$ respectively quantized by the quantization units 325, 360, 370, and the flag value F set by the flag-setting unit 335.

A video encoder 300 of FIG. 8 is implemented by an open-loop type. However, it may be implemented by a closed-loop type. For this, the video encoder 300 uses the reconstructed image A' of A, instead of A, in the adder, and the subtractor 350 may use the reconstructed image B' of A, instead of B.

Figure 9:
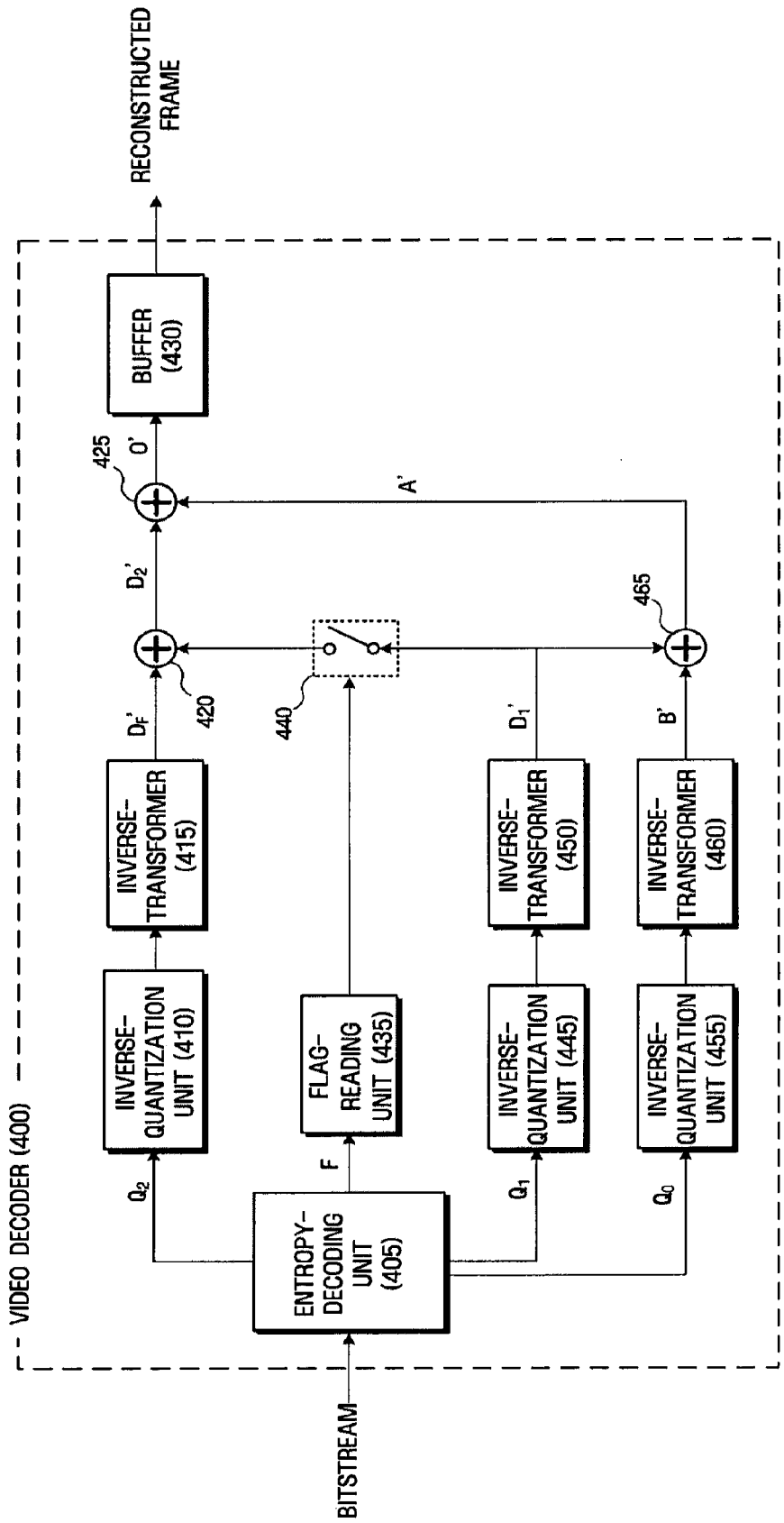
FIG. 9 is a block diagram illustrating configuration of a video decoder according to a second exemplary embodiment of the present invention.

FIG. 9 is a block diagram illustrating configuration of a video decoder 400 according to a second exemplary embodiment of the present invention.

With reference to FIG. 9, an entropy-decoding unit 405 extracts a quantization coefficient $Q_2$ of the current layer, a quantization coefficient $Q_1$ of the first lower layer, a quantization coefficient $Q_0$ and a flag F of the second lower layer.

A flag-reading unit 435 reads out the extracted flag F and determines if the difference prediction is applied to the input bitstream. If the difference prediction is applied, a switch 440 provides the reconstructed first difference block $D_1'$ to an adder 420.

The quantization coefficient $Q_2$ of the current layer is reconstructed to the final difference block $D_F$ through a inverse-quantization unit 410 and inverse-transformer 415, the quantization coefficient $Q_1$ of the first lower layer is reconstructed to the first difference block $D_1'$ through a inverse-quantization unit 445 and inverse-transformer 450, and the quantization coefficient $Q_0$ of the second lower layer is reconstructed to the block B' of the second lower layer frame through the inverse-quantization unit 445 and a inverse-transformer 460.

An adder 465 reconstructs the block A' of the first lower layer frame by adding the block B' of the reconstructed second lower layer frame to the reconstructed first difference block $D_1$. In addition, the adder 420 reconstructs the second difference block $D_2'$ by adding the reconstructed final difference block $D_F'$ to the reconstructed first difference block $D_1'$. Then, an adder 425 reconstructs the block O' of the current layer frame and stores it in a buffer by adding the reconstructed second difference block $D_2'$ to the block A' of the first lower layer frame.

The buffer 430, in which a plurality of blocks included in a single frame are stored, reconstructs a complete frame (current layer frame) from them.

Each of the elements described above with reference to FIGS. 5 and 8 may be implemented by software executed at a predetermined region in a memory, such as a task, class, sub-routine, process, object, execution thread, or program, hardware, such as a Field-Programmable Gate Array (FPGA) or an Application-Specific Integrated Circuit (ASIC), or a combination of such software and hardware. These elements may be included in a computer-readable storage medium or distributed to multiple computers.

According to the exemplary embodiments of the present invention, the compression efficiency of a video encoder and the picture quality of a video having identical bit ratio can be improved.

The exemplary embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. A method of encoding a video frame having a plurality of layers, the method comprising:

obtaining, by a video encoding apparatus, a first difference block between a block of a first layer, among the plurality of layers of the video frame, and a first prediction block which is used to perform an intra-prediction on the block of the first layer;

obtaining, by the video encoding apparatus, a second difference block between a block of a second layer, among the plurality of layers, corresponding to the block of the first layer and a second prediction block which is used to perform an intra-prediction on the block of the second layer; and obtaining, by the video encoding apparatus, a final difference block between the first difference block and the second difference block.

2. The encoding method of claim 1, wherein the block is an image area that has a predetermined size and is included in the video frame.

3. The encoding method of claim 1, wherein the block of the first layer and the block of the second layer have identical temporal and spatial positions.

4. The encoding method of claim 1, wherein the intra-prediction is a directional intra-prediction, the first prediction block is a block generated by performing a directional intra-prediction from neighboring pixels of a block of the first layer, and the second prediction block is a block generated by performing a directional intra-prediction from neighboring pixels of a block of the second layer.

5. The encoding method of claim 4, wherein the neighboring pixels are pixels reconstructed through quantization and inverse-quantization.

6. The encoding method of claim 1, wherein the intra-prediction is an intra-base prediction, the first prediction block is a block of the second layer, the second prediction block is a block of a third layer corresponding to the block of the second layer.

7. The encoding method of claim 6, wherein the block of a second layer used as the first prediction block and the block of the third layer used as the second prediction block are blocks reconstructed through quantization and inverse-quantization.

8. The encoding method of claim 1, further comprising quantizing the final difference block.

9. The encoding method of claim 8, further comprising setting a flag indicating that the video encoding method includes obtaining a difference between the first difference block and the second difference block.

10. The encoding method of claim 9, further comprising performing lossless coding of a quantized result and the flag.

11. A method of decoding a video, the method comprising:
reconstructing, by a video decoding apparatus, a first difference block from coded data of a first layer, among a plurality of layers of a video frame, included in an input bitstream;
reconstructing, by the video decoding apparatus, a final difference block from coded data of a second layer, among the plurality of layers of the video, included in the input bitstream;
reconstructing, by the video decoding apparatus, a second difference block by adding the first difference block to the final difference block;
generating, by the video decoding apparatus, a prediction block with respect to a block of the second layer included in the video frame in order to be reconstructed through intra-prediction; and
reconstructing, by the video decoding apparatus, the block of the second layer by adding the generated prediction block to the reconstructed second difference block.

12. The video decoding method of claim 11, wherein the block is an image area having a predetermined size and is included in the video frame.

13. The video decoding method of claim 11, wherein the intra-prediction is a directional intra-prediction, and the prediction block is a block generated by performing a directional intra-prediction from neighboring pixels of a block of the second layer.

14. The video decoding method of claim 11, wherein the intra-prediction is an intra-base prediction, and the prediction block is a block of the first layer corresponding to the block of the second layer.

15. The video decoding method of claim 14, wherein a block of the first layer and that of the second block have identical temporal and spatial positions.

16. The video decoding method of claim 14, wherein a block of the first layer is obtained by adding the coded data of a third layer included in the bitstream to the reconstructed first difference block.

17. The video decoding method of claim 11, further comprising reading out a flag indicating that the bitstream is coded by performing difference prediction.

18. The video decoding method of claim 11, further comprising assembling the blocks of the reconstructed second layer and configuring a video frame to be reconstructed.

19. The video decoding method of claim 11, wherein the reconstructing of the first difference block and the reconstructing of the final difference block respectively comprise an entropy decoding procedure, inverse-quantization procedure, and inverse-transforming process.

20. A video encoder for encoding a video frame having a plurality of blocks, the video encoder comprising:
means for obtaining a first difference block between a block of a first layer, among the plurality of layers of the video frame, and a first prediction block which is used to perform an intra-prediction on the block of the first layer;
means for obtaining a second difference block between a block of a second layer, among the plurality of layers, corresponding to the block of the first layer and a second prediction block which is used to perform an intra-prediction on the block of the second layer; and
means for obtaining a final difference block between the first difference block and the second difference block,
wherein at least one of the means for obtaining the first difference block, the means for obtaining the second difference block, and the means for obtaining the final difference block is implemented as hardware.

21. A video decoder comprising:
means for reconstructing a first difference block from coded data of a first layer, among a plurality of layers of a video frame, included in an input bitstream;
means for reconstructing a final difference block from coded data of a second layer, among the plurality of layers of the video frame, included in the input bitstream;
means for reconstructing the second difference block by adding the first difference block to the final difference block;
means for generating a prediction block with respect to a block of the second layer included in the video frame in order to be reconstructed through intra-prediction, and
means for reconstructing the block of the second layer by adding the generated prediction block to the reconstructed second difference block,
wherein at least one of the means for reconstructing the first difference block, the means for reconstructing the final difference block, the means for reconstructing the second difference block, the means for generating the prediction block, and the means for reconstructing the block is implemented as hardware.

* * * * *